(12) United States Patent
Nielsen et al.

(10) Patent No.: US 10,376,853 B2
(45) Date of Patent: Aug. 13, 2019

(54) METHOD OF OPERATING A BATCH MIXER AND BATCH MIXER FOR PERFORMING THE METHOD

(71) Applicant: ANDRITZ FEED & BIOFUEL A/S, Esbjerg Ø (DK)

(72) Inventors: Kenneth Nielsen, Esbjerg (DK); Jesper Blok, Bramming (DK); Christian Gejl Pedersen, Esbjerg (DK)

(73) Assignee: ANDRITZ FEED & BIOFUEL A/S, Esbjerg Ø (DK)

( * ) Notice: Subject to any disclaimer, the term of this patent is extended or adjusted under 35 U.S.C. 154(b) by 202 days.

(21) Appl. No.: 15/509,306

(22) PCT Filed: Sep. 30, 2014

(86) PCT No.: PCT/IB2014/064960
§ 371 (c)(1),
(2) Date: Mar. 7, 2017

(87) PCT Pub. No.: WO2016/051232
PCT Pub. Date: Apr. 7, 2016

(65) Prior Publication Data
US 2017/0282136 A1    Oct. 5, 2017

(51) Int. Cl.
*B01F 7/04*     (2006.01)
*B01F 7/00*     (2006.01)
(Continued)

(52) U.S. Cl.
CPC .......... *B01F 7/00158* (2013.01); *A01K 5/002* (2013.01); *B01F 7/022* (2013.01);
(Continued)

(58) Field of Classification Search
CPC ........................................................ B01F 7/04
(Continued)

(56) References Cited

U.S. PATENT DOCUMENTS

| 35,110 A | * | 4/1862 | Pierce ................... A47J 43/044 |
| | | | 261/32 |
| 5,607,235 A | * | 3/1997 | Campbell .......... B01F 7/00908 |
| | | | 366/147 |

(Continued)

FOREIGN PATENT DOCUMENTS

| EP | 0 569 854 A1 | 11/1993 |
| EP | 2 689 833 A2 | 1/2014 |

(Continued)

*Primary Examiner* — David L Sorkin
(74) *Attorney, Agent, or Firm* — Birch, Stewart, Kolasch & Birch, LLP

(57) ABSTRACT

The invention provides a method of operating a batch mixer for producing first and second numbers of mixtures from first and second numbers of batches of materials to be mixed in the batch mixer, the batch mixer comprising a mixing chamber, a mixing element disposed within the mixing chamber, the mixing element and the mixing chamber being configured for providing an identical flow of the materials to be mixed within the mixing chamber and around the mixing element regardless of in which of the first and second opposite directions the mixing element is rotated, and a motor assembly coupled to the mixing element for rotating the mixing element for mixing the first and second numbers of batches of materials to be mixed for producing the first and second numbers of mixtures. The method comprises the steps of energizing said motor assembly for rotating said mixing element in said first direction, for each one of the first number of batches of the materials to be mixed: loading the one of the first number of batches of materials to be mixed into the mixing chamber, mixing the one of the first number of batches of materials for producing one of the first number of mixtures, and removing the one of the first number of mixtures from the mixing chamber, energizing the motor assembly for rotating the mixing element in the second direction, and for each one of the second number of batches (Continued)

Figure 1:
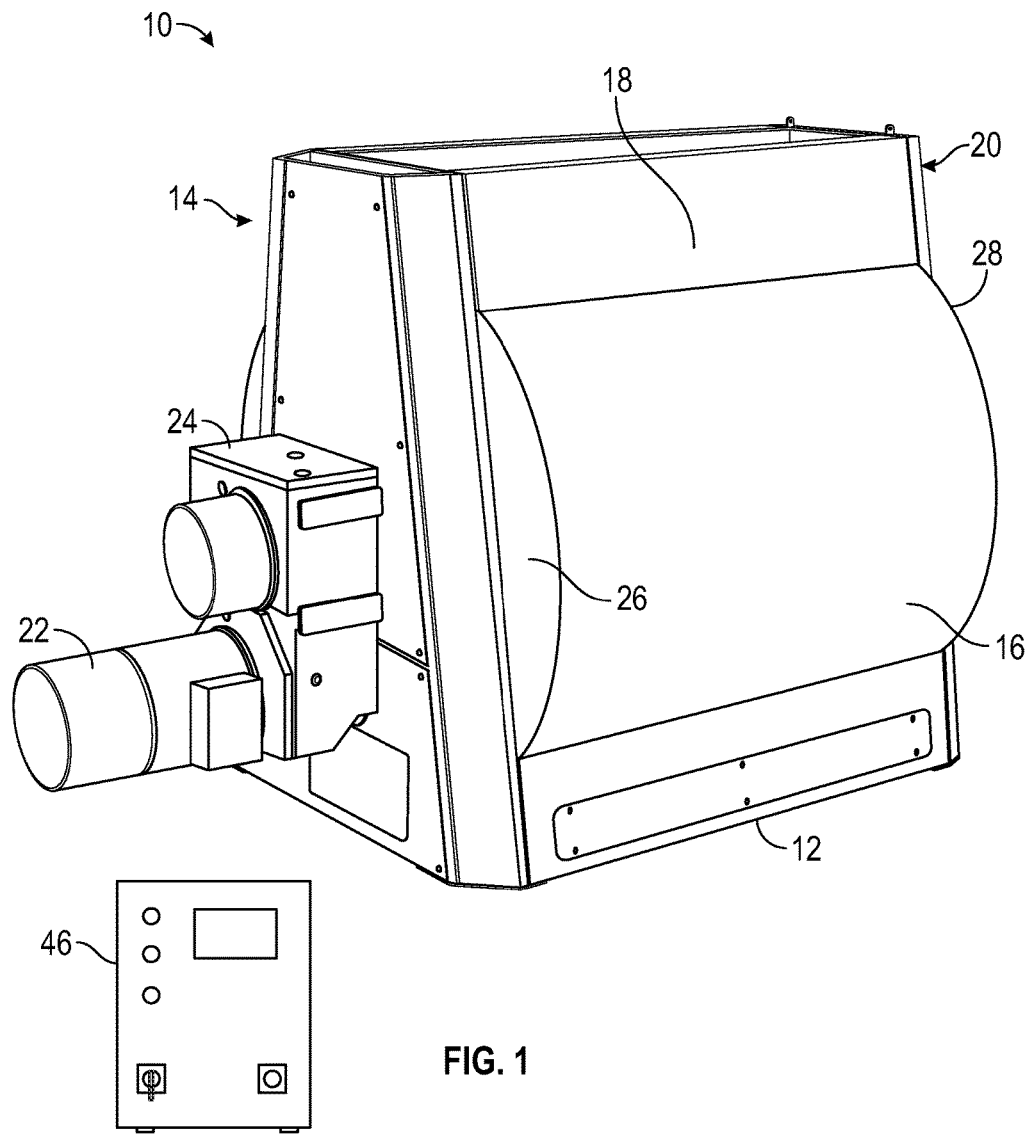

of the materials to be mixed loading the one of the second number of batches of materials to be mixed into the mixing chamber, mixing the one of the second number of batches of materials for producing one of the second number of mixtures, and removing the one of the second number of mixtures from the mixing chamber.

20 Claims, 4 Drawing Sheets

(51) Int. Cl.
- *B01F 7/02* (2006.01)
- *B01F 15/00* (2006.01)
- *B01F 15/02* (2006.01)
- *B08B 7/02* (2006.01)
- *A01K 5/00* (2006.01)
- *B08B 9/08* (2006.01)
- *B08B 17/02* (2006.01)

(52) U.S. Cl.
CPC .......... *B01F 7/04* (2013.01); *B01F 15/00019* (2013.01); *B01F 15/00785* (2013.01); *B01F 15/0254* (2013.01); *B08B 7/02* (2013.01); *B08B 9/0808* (2013.01); *B08B 17/02* (2013.01); *B01F 2215/0024* (2013.01); *B01F 2215/0422* (2013.01)

(58) Field of Classification Search
USPC ................ 366/276, 278, 325.1, 325.3, 330.1
See application file for complete search history.

(56) References Cited

U.S. PATENT DOCUMENTS

| | | |
|---|---|---|
| 5,626,421 A | 5/1997 | Campbell |
| 5,772,725 A | 6/1998 | Eckert |
| 6,322,244 B1 * | 11/2001 | Marchesini ......... B01F 7/00158 366/319 |
| 7,458,716 B2 | 12/2008 | Kato |
| 2007/0263480 A1 | 11/2007 | Saalmann et al. |

FOREIGN PATENT DOCUMENTS

| | | |
|---|---|---|
| JP | 60-034721 A | 2/1985 |
| JP | 2005-118758 A | 5/2005 |

* cited by examiner

METHOD OF OPERATING A BATCH MIXER AND BATCH MIXER FOR PERFORMING THE METHOD

The present invention concerns a method of operating a batch mixer so as to minimize the need for cleaning the batch mixer and a batch mixer for performing the method.

Batch mixers are used inter alia to mix ingredients for making animal feeds by mixing corn, maize, soy beans and other ingredients. Often the mixed materials, i.e. the mix of materials produced by the batch mixer, are used in a further process such as production of pellets in a pellet mill or extruder.

One example of a batch mixer is the Paddle mixer Type HPB sold by the applicant company. This batch mixer comprises a cylindrical mixing chamber having an upper inlet through which the solid materials to be mixed are introduced in the mixing chamber. Also disposed in the upper part of the mixing chamber but separate from the upper inlet are injection nozzles for injecting fluid material such as water, steam, oils, molasses and other liquid additives to be mixed with the solid materials to be mixed. The bottom part of the mixing chamber comprises an outlet gate openable for allowing the mixed material to fall from the mixing chamber down into a receptacle placed beneath the batch mixer. On the side of the batch mixer is provided inspection and cleaning hatches which allow access to the interior of the mixing chamber from the outside of the batch mixer.

Mixing is effected by a mixer shaft running through the centre of the mixing chamber from a bearing in one end of the mixing chamber to a motor assembly mounted to the other end of the mixing chamber. The motor assembly comprises an electric motor which drives the mixer shaft via a gearbox. Paddles extending radially from the mixer shaft are attached to the mixer shaft at staggered spiralled positions along the length of the mixer shaft, the paddles engaging the material to be mixed for mixing the materials to be mixed.

As mentioned above, the sides of the mixing chamber comprise inspection and cleaning hatches. During mixing, part of the materials to be mixed, as well as part of the mixed materials, is deposited on different parts of the batch mixer and is not efficiently expelled from the mixing chamber upon opening the outlet gate. These deposits may for example form on the mixer shaft, the paddles, around the upper inlet, and on or around the injection nozzles and may disturb the operation of the batch mixer by causing unbalance in the mixer shaft, lowering the mixing efficiency of the paddles, clogging the upper inlet preventing charging the mixing chamber with the materials to be mixed, and clogging the injection nozzles. Furthermore, build-up of mixed materials or materials to be mixed in the batch mixer causes increased load on the motor assembly, the bearings and the mixer shaft.

Consequently, the batch mixer must regularly be cleaned by opening the inspection and cleaning hatches. Such cleaning results in downtime for the batch mixer, i.e. time when it is not used to mix materials, and is labour intensive and generally tiresome. Cleaning is also needed to minimize cross contamination between batches.

U.S. Pat. No. 7,458,716 B2 discloses a particulate mixer having paddles of different lengths. The particulate mixer is part of a blender that includes a cylindrical drum with a particulate mixing chamber. A rotating shaft is arranged in a horizontal direction in the particulate mixing chamber. Four arms project in a radial direction from the rotating shaft and include four paddles with respective stirring blades spaced from each other in an axial direction on the rotating shaft. The drum has a cylindrical center portion and side portions that communicate with the cylindrical center portion. Each of the side portions has a lower face and a vertical face. The drum is in the form of a truncated cone with the rotating shaft as its axis. The stirring blades have a driving end face and a driven end face with slopes corresponding to the slopes of the lower face of the side portions.

It is therefore an object of the present invention to provide a method of operating a batch mixer so as to minimize the need for cleaning the batch mixer.

It is furthermore an object of the present invention to provide a batch mixer for performing the method.

It is further an object of the present invention to simplify the cleaning of a batch mixer, and correspondingly to provide a batch mixer which is easy to clean.

At least one of the above objects, or at least one of the further objects which will be evident from the below description of the present invention, is according to the first and second aspects of the present invention achieved by a method of operating a batch mixer as defined in claim 1 and a batch mixer for performing the method as defined in claim 7.

As the direction of rotation changes after the first number of batches, surfaces on which the first number of mixtures and/or materials to be mixed are deposited when mixing the first number of batches using the first direction are swept clear by the flow of material to be mixed, and the second number of mixtures, during mixing of the second number of batches using the second opposite direction.

In contrast to prior art methods the method according to the first aspect of the present invention changes the direction of rotation between batches, i.e. between the first number of batches and the second number of batches, thus maximizing the time that the batch mixer can mix. Although it could be possible to change direction of rotation during the mixing of a single batch, the change of direction of rotation requires a very high amount of power, and consequently an oversized motor assembly, due to the large amounts of materials mixed in a batch, for example 5-8 tons. In contrast, the method according to the first aspect of the present invention maximizes the time for which the batch mixer is available for mixing batches. Further, the motor assembly needs only be dimensioned for rotating the mixing element in a single direction during the mixing of each batch.

The first number and second numbers should be chosen such that any deposits formed during running in the first direction do not grow to such an extent so as to negatively affect the operation of the batch mixer, for example by causing imbalance of the mixing element or seizing of the mixing element or non-reproducible mixing. Typically the first and second numbers are 10 or below. Most preferably the first and second numbers are each 1, i.e. the direction of rotation changes between each batch mixed in order to best prevent the formation of deposits.

Preferably the steps of the method are performed in the given order. Each one of the first and second numbers of mixtures is removed from the mixing chamber before the next one of the respective first and second numbers of batches is loaded to prevent cross contamination. Each of the first and second mixtures may be removed from the mixing chamber via an outlet gate provided in the bottom of the mixing chamber.

The method may further comprise the step of pausing the rotation of the mixing element while the one of the first and second mixtures, respectively, is removed from the mixing chamber.

The mixing element and the mixing chamber may be configured, for providing an identical flow of the materials to be mixed within the mixing chamber regardless of in which of the first and second opposite directions the mixing element is rotated, by the mixing chamber being cylindrical and symmetrical and the mixing element being symmetrical.

The mixing paddles are arranged in the mixing element so that rotation of the mixing elements causes the materials to be mixed to flow towards the centre of the mixing chamber. This is advantageous as it prevents stress on the ends of the mixing chamber. Flow of the materials to be mixed towards the centre of the mixing chamber further provides a better mixing.

The mixing chamber is preferably cylindrical having a wall, i.e. the mantle surface of the cylinder, and first and second opposite ends corresponding to the base and top of the cylinder. The mixing chamber is preferably placed horizontally.

The motor assembly preferably comprises an electric motor which rotates the mixing element via a gearbox; however, it is also possible to use other motors such as a hydraulic or pneumatic motor.

The control device may be configured by comprising or being connected to an inverter capable of driving the motor assembly in either direction.

The control device may for example comprise a computer or control system connected to the batch mixer, or may alternatively comprise a chip or controlling circuit provided on or in the batch mixer.

As the control device is preferably further configured for causing the motor assembly to rotate the mixing element with equal duration, rotational speed and/or intensity of rotation in both of the first and second directions of rotation, it is ensured that the first and second batches are mixed in the same way and that the quality of mixing is the same. If the one of the second number of batches is smaller or larger than the one of the first number of batches, which may for example be determined by weighing the batch mixer with the one of the second number of batches of materials to be mixed loaded in the mixing chamber, the duration, rotational speed and/or intensity of the rotation in the second direction may be decreased or increased; however, typically each of the first and second numbers of batches comprises the same size and amounts of materials to be mixed whereby the duration, rotational speed and intensity of mixing are identical for both directions of rotations.

Typically the rotational speed and intensity of mixing are constant during mixing of each of the first and second numbers of batches; however, the rotational speed and/or intensity of mixing may alternatively vary during the mixing of each of the first and second numbers of batches.

The batch mixer according to the second aspect of the present invention is suitable for performing the method according to the first aspect of the present invention.

An advantage of the method according to the first aspect of the present invention is that the method may, as defined in claim 2, be performed for a plurality of numbers of batches. By changing the direction of rotation after each number of batches the build up of deposits of materials to be mixed or of the first or second number of mixtures is reduced providing for mixing a large plurality of batches before cleaning of the batch mixer is required. This increases the productivity of the batch mixer. The plurality may for example be up to thousands of batches.

Said materials to be mixed of said first number of batches or said first number of mixtures tend to build up deposits on a first set of parts of said mixing element when rotating said mixing element in said first direction, said deposits being at least partially removed from said first set of parts of said mixing element by the friction between said first set of parts and said materials to be mixed of said second number of batches or said second number of mixtures when rotating said mixing element in said second direction, and preferably said materials to be mixed of said second number or batches tend to build up deposits on a second set of parts of said mixing element when rotating said mixing element in said second direction, said deposits being at least partially removed from said second set of parts of said mixing element by the friction between said second set of parts and said materials to be mixed of said first number of batches or said first number of mixtures when rotating said mixing element in said first direction. Thereby, the formation of deposits and the removal of the deposits during the performance of the method according to the first aspect of the present invention are defined. The first and second sets of parts of the mixing element are generally those parts of the mixing element which, for a given direction of rotation, do not come into contact with the materials to be mixed or the first and second numbers of mixtures. These first and second sets of parts include for example parts of the mixing element which do not move, or only move at a slow pace, in relation to the materials to be mixed or the first and second numbers of mixtures during the rotation of the mixing element.

When the method according to the first aspect of the present invention is performed a plurality of times, the deposits formed during rotation in the first direction of rotation are at least partially removed when the mixing element is rotated in the second direction and vice versa.

Typically the first and second numbers of batches comprise the same composition and amounts of material to be mixed as defined in claim 3. By having the same composition and amounts of materials to be mixed it is ensured that the flow of materials to be mixed during the rotation of the mixing element is the same for both directions of rotation.

The method according to the first aspect of the present invention is especially suitable for mixing batches as defined in claim 4. This is because these ingredients have a strong tendency of forming deposits in batch mixers. This causes problems with cross contamination. Further, these ingredients are typically mixed in large quantities meaning that a high productivity of mixing is needed for these ingredients to meet the demand. The large quantities further means that large amounts of power to the motor assembly is needed for effecting mixing, thus the mixer should be kept as clean as possible to minimize power use.

Claim 6 defines a preferred embodiment of the method according to the first aspect of the present invention. By having the duration, rotational speed and/or intensity of rotation being the same for both directions of rotation it is ensured that the first and second numbers of batches are mixed in the same way and that the quality of mixing is the same. If one of the second number of batches is smaller or larger than one of the first number of batches, the duration, rotational speed and/or intensity of the rotation in the second direction is typically the same as the first direction; however, it may be decreased or increased. Typically each of the first and second numbers of batches has the same size and amount of materials to be mixed whereby the duration, rotational speed and intensity of mixing are identical for both directions of rotations.

Typically the rotational speed and intensity of mixing are constant during mixing of each of the first and second batches; however the rotational speed and/or intensity of mixing may alternatively vary during the mixing of each of the first and second numbers of batches.

As the mixing paddle is a closed elongated prism, i.e. a closed body, a minimum amount of materials to be mixed or the first and second numbers of mixture can form deposits on the mixing paddle. Where the mixing element comprises a mixer shaft, one end of the triangular prism may be directly attached, or alternatively attached via a paddle shaft, for extending radially from the mixer shaft. The other opposite end, comprising a triangular end face then faces away radially from the mixer shaft.

During rotation of the mixing element the first face, being orthogonal to the axis of rotation of the mixing element, passes through the materials to be mixed and the first and second numbers of mixtures with minimum resistance. Resistance is limited to the friction as some of the materials to be mixed or the first and second numbers of mixtures slide tangentially over the first face. The second and third faces, however, form an angle to the first face and thereby will engage the materials to be mixed and the first and second numbers of mixtures at an angle such that the materials to be mixed and the first and second numbers of mixtures are forced along the axis of rotation of the mixing element and in a direction tangential to the rotation of the mixing element. Thus, the second and third faces, depending on the direction of orientation, cause material flow of the materials to be mixed and the first and second numbers of mixtures, thereby effecting mixing of the materials to be mixed.

During mixing, one of the second and third faces, depending on the direction of rotation of the mixing element, will be a leading face as it engages the materials to be mixed before the other one of the second and third faces which will be a trailing face. During mixing, the materials to be mixed, and the first or second number of mixtures, tend to form deposits on the trailing face as practically none of the materials to be mixed or the first and second numbers of mixtures contact this face as the mixing element rotates.

When the direction of rotation is changed, the leading face becomes the trailing face, thus allowing the materials to be mixed and the first and second numbers of mixtures to clean the leading face of any deposits formed when the leading face was the trailing face during rotation in the opposite direction.

The first and second angles must be identical as otherwise the material flow, dependent on the angle with which the leading face engages the materials to be mixed, will vary depending on the direction of rotation. This leads to the first and second numbers of batches being mixed unequally.

The faces of the mixing paddle are each preferably a flat rectangular, square or trapezoidal plate for simplifying manufacturing the mixing element; however, the faces of the mixing paddle may alternatively be curved.

The embodiments of the batch mixer according to the second aspect of the present invention as defined in claim 8 include preferred configurations for the faces of the mixing paddles. Most preferred is it when the first and second angles are 60°, this corresponding to a symmetrical prism having the cross section, and accordingly the end face, of an equilateral triangle, because in this configuration the mixing paddle may be rotated 60° if any of the second and third faces becomes damaged for replacing one of the second and third faces with the first paddle face.

Claim 9 defines a preferred embodiment of the batch mixer according to the second aspect of the present invention. The two groups of mixing paddles force the materials to be mixed into the centre of the mixing element, thus providing an overall neutral thrust on the mixing element. Preferably the mixing paddles are spaced apart evenly along the mixer shaft, and the width of each mixing paddle along the axis of the mixer so adapted that the mixing paddles together sweep along all of the wall of the mixing chamber.

The two mixing paddles in each group are preferably arranged 180° from each other in a plane orthogonal to the mixer shaft.

Preferably the angle between the mixing paddles of the first group and the mixing paddles of the second group is 90° in a plane orthogonal to the mixer shaft.

The mixing paddles may alternatively be arranged such that the angle between two neighbouring mixing paddles along the mixer shaft is 90° in a plane orthogonal to the mixer shaft so that the mixing paddles form a spiral around the mixer shaft.

More preferably, however, each of the two groups comprises three mixing paddles arranged 120° from each other in a plane orthogonal to the mixer shaft.

The first end of the mixer shaft is preferably attached to the motor assembly such that the mixer shaft may be caused to rotate by the motor assembly.

The preferred embodiments of the method, according to the first aspect of the present invention as defined in claim 5, and of the batch mixer according to the corresponding second aspect of the present invention as defined in claim 10, are advantageous as they ensure that the injection nozzle is at least partially cleaned from deposits of the materials to be mixed or the first or second number of mixtures each time that a batch of materials to be mixed are loaded into the mixing chamber through the upper inlet. Thus, typically no separate cleaning of the injection nozzle is needed.

The injection nozzle typically comprises a pipe extending from the wall of the upper inlet forming a bend towards the interior of the mixing chamber and terminating in a nozzle.

Preferably a number of injection nozzles are provided for effectively adding the liquid additive to the materials to be mixed or for allowing the addition of different additives to the materials to be mixed.

The upper inlet preferably comprises a rectangular opening in the upper wall of the mixing chamber. The upper inlet may further comprise a rectangular chute attached to the rectangular opening.

The effectiveness of removing deposits formed on the injection nozzle from the materials to be mixed or from the first or second number of mixtures depends on the impulse of the materials to be mixed as they fall through the inlet opening into the mixing chamber. To increase this effectiveness the height from which the materials to be mixed fall may be increased.

Optionally the upper inlet, in particular the chute, may have its wall coated with a low friction material such as polytetrafluoroethylene. The injection nozzle may also be coated with, or made of, polytetrafluoroethylene to further reduce the formation of deposits.

The additive is preferably injected after each one of the first number of batches of materials to be mixed has been mixed for a short time.

Likewise, the additive is preferably injected after each one of the second number of batches of materials to be mixed has been mixed for a short time. This provides a good mixing of the additive with the materials to be mixed.

The provision of the injection nozzles in or on the wall of an upper inlet as defined in claim 10 may be used also with other types of batch mixers having an upper inlet, i.e. not only with the batch mixer according to the second aspect of the present invention, for providing a batch mixer with at least partially self-cleaning injection nozzles. Thus, a batch mixer having a mixing chamber and a mixing element provided within the mixing chamber may further comprise an upper inlet in which at least one injection nozzle for injecting at least one additive into the mixing chamber is provided as defined in claim 10 and/or as described below with reference to FIG. 2. The injection nozzle may be provided in or on the wall of the upper inlet such that when materials to be mixed are loaded into the mixing chamber, the materials flow around and past the injection nozzle for at least partially removing any deposits formed of the materials to be mixed from the injection nozzle.

The preferred embodiment of the batch mixer according to the second aspect of the present invention as defined in claim 11 is advantageous as it allows the mixing chamber, in particular the walls of the mixing chamber extending along the mixing element, to be smoother as they are not disturbed by the inspection and cleaning opening, so that the mixing element may rotate closer to the walls of the mixing chamber extending along the mixing element. Configuring the mixing element so that it rotates closer to the walls prevents that materials to be mixed remain in the mixing chamber along the wall of the mixing chamber when the mixing chamber is emptied. It further prevents deposits of the materials to be mixed from forming on the wall of the mixing chamber.

Furthermore, the inspection and cleaning opening, by being disposed on one of the ends of the mixing chamber, is continuously cleaned from deposits of the material to be mixed as the mixing element, in particular a mixing paddle of the mixing element, passes laterally over the inspection and cleaning opening and forces materials to be mixed along the plane of the inspection and cleaning opening each revolution of the mixing element. This is in contrast to the prior art batch mixer wherein material to be mixed by the mixing element is forced radially out against the wall of the mixing chamber, thus forcing the materials orthogonally to the plane of the inspection and cleaning opening, i.e. against a prior art wall mounted inspection and cleaning opening which may cause build up of deposits on and around the inspection and cleaning opening.

The inspection and cleaning opening is preferably rectangular and closable by a hatch comprised by the batch mixer. The inspection and cleaning opening is preferably sized so as to allow an operator of the batch mixer to enter the mixing chamber through the inspection and cleaning opening.

Generally the mixing chamber is cylindrical whereby the curving wall of the mixing chamber refers to the mantle of the cylinder and the end of the mixing chamber refers to the base and top of the cylinder. Preferably the mixing element rotates around an axis extending from the first end to the second end, in other words such that the curving wall of the mixing chamber corresponds closely to the circumference of the rotating mixing element.

Preferably the inspection and cleaning opening is provided on a first end of the mixing chamber, and the motor assembly is attached to the second opposite end of the mixing chamber. The first end of the mixing chamber further may support a bearing for journaling the mixing element, for example by journaling the second end of the mixer shaft.

The provision of an inspection and cleaning opening on one end of a mixing chamber as defined in claim 11 may also be used with other types of batch mixers, i.e. not only with the batch mixer according to the second aspect of the present invention, for providing a batch mixer with at least partially self cleaning inspection and cleaning opening. Thus, a batch mixer having a preferably cylindrical mixing chamber having a curved wall and opposite first and second ends and a mixing element provided within the mixing chamber may comprise an inspection and cleaning opening on of the first and second ends as defined in claim 11 and/or as described with reference to FIG. 4 below. Such a batch mixer may also include an upper inlet with injection nozzles provided in or on the wall of the upper inlet as described above.

The preferred embodiment of the batch mixer according to the second aspect of the present invention as defined in claim 12 is advantageous in that it provides simple access to the inspection and cleaning opening or the upper inlet for the operator. Providing the steps on the swivable housing part, which is a part of the batch mixer, is safer and more convenient than using a separate ladder.

Preferably the swivable housing part is arranged such that it covers the inspection and cleaning opening when in the closed position and uncovers the inspection and cleaning opening when in the open position.

The swivable housing part may for example comprise a rectangular plate or a trapezoid plate. The steps are typically formed of sheet metal welded to the second side.

The cover for the inspection and cleaning opening may be attached to the second side of the swivable housing part, or alternatively a part of the second side of the swivable housing part may define the cover. This simplifies access to the inspection and cleaning opening.

Preferably the pivot axis is horizontal and attached to one side of the swivable housing part. Preferably the swivable housing part comprises a rectangular plate or a trapezoid plate having a first lower side and an opposite second upper side, the pivot axis extending along the first lower side and the second side resting against an underlying substrate, such as the ground or flooring, supporting the batch mixer when the swivable housing part is in the open position.

The provision of a swivable housing part as defined in claim 12 may be used also with other types of batch mixers, i.e. not only with the batch mixer according to the second aspect of the present invention, for providing a batch mixer with integrated steps for making it easier for an operator of the batch mixer to access high up parts, such as an upper inlet or an inspection and cleaning opening, on the batch mixer. Thus, a batch mixer having a mixing chamber and a mixing element provided within the mixing chamber may comprise a swivable housing part as defined in claim 12 or as described with reference to FIG. 4 below.

Such a batch mixer may preferably also include an inspection and cleaning opening as described above and/or an upper inlet with injection nozzles provided in or on the wall of the upper inlet as described herein.

Figure 2A:
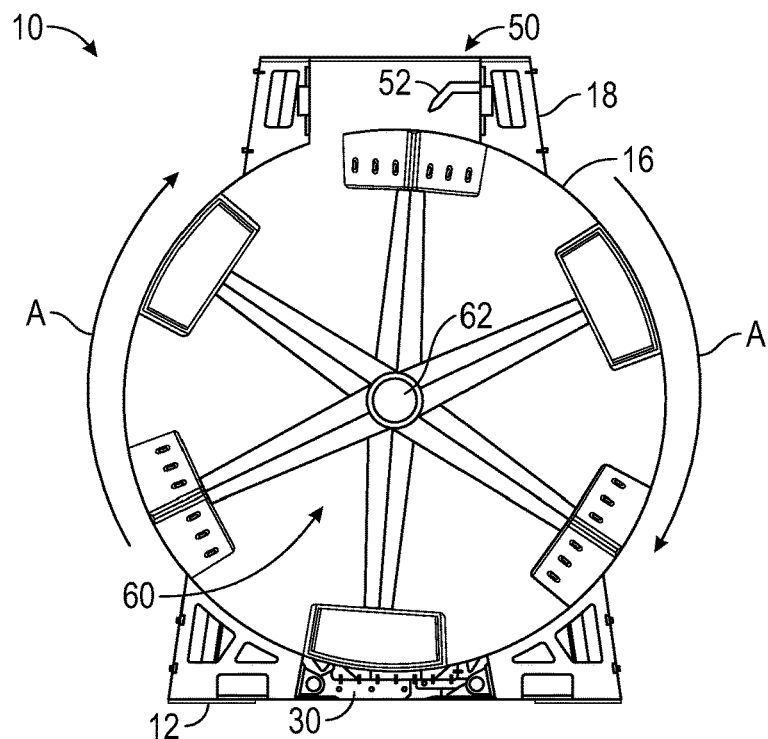
Figure 2B:
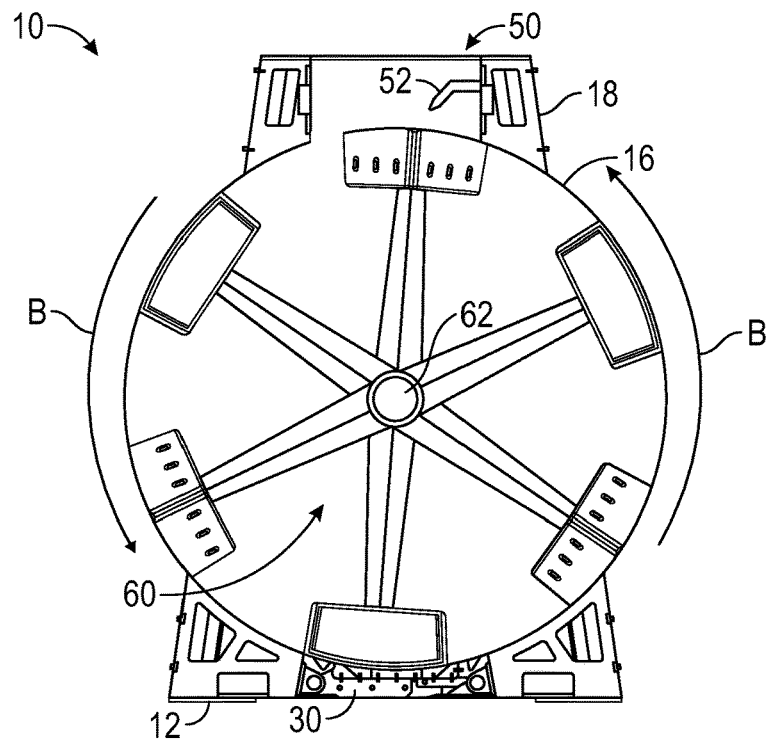
Figure 3A:
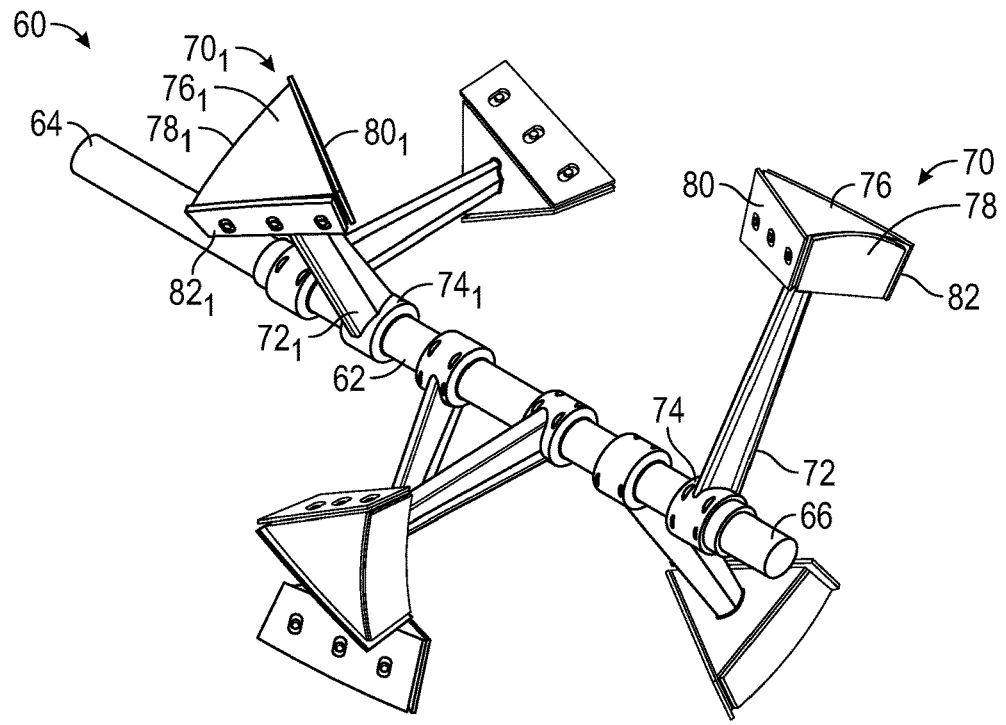
Figure 3B:
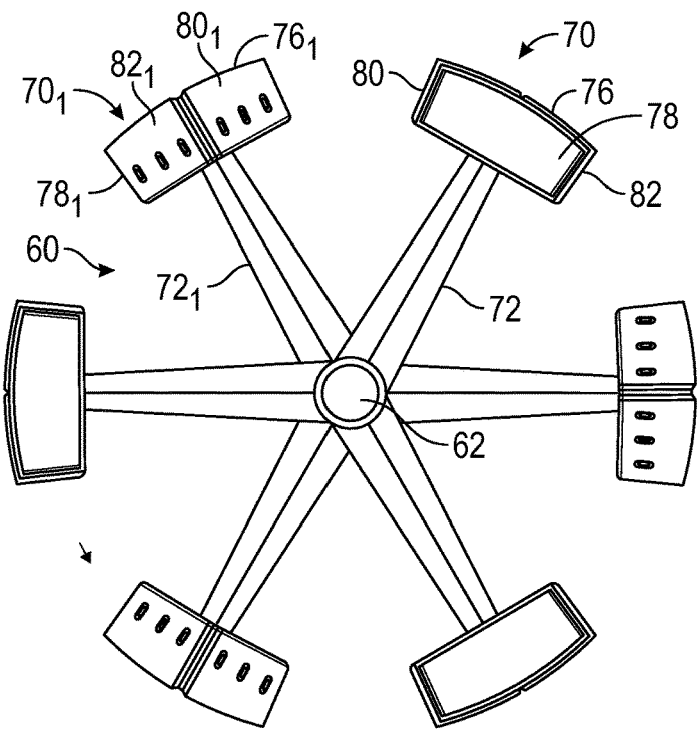
Figure 4A:
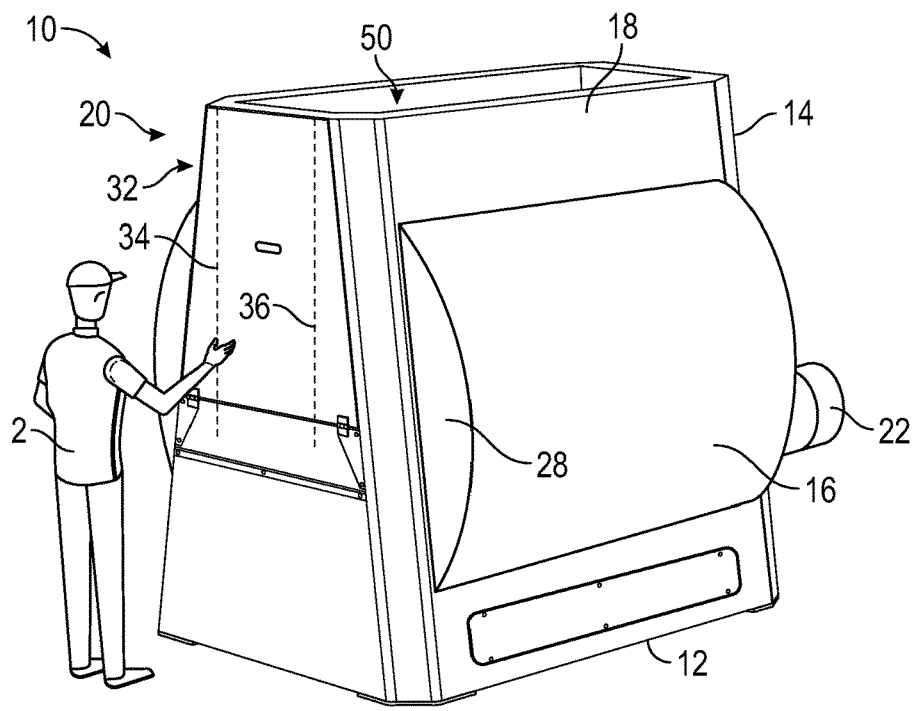
Figure 4B:
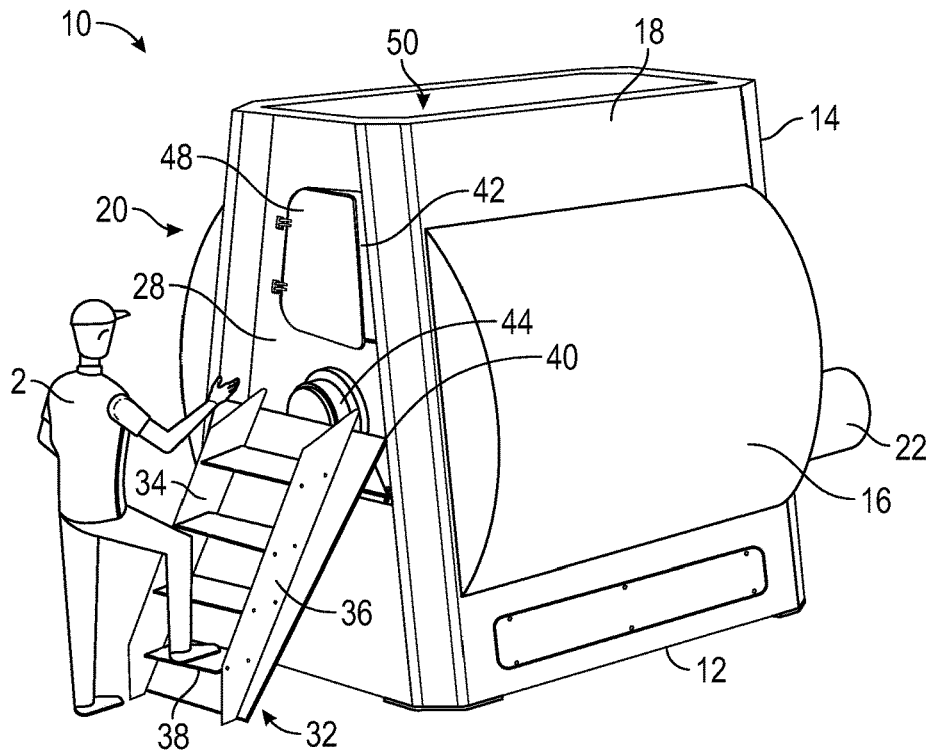

The invention and its many advantages will be described in more detail below with reference to the accompanying schematic drawings, which for the purpose of illustration show some non-limiting embodiments, and in which:

FIG. 1 shows, in perspective view, a first embodiment of a batch mixer according to the second aspect of the present invention, FIGS. 2A and 2B show, in cross section, the first embodiment of the batch mixer according to the second aspect of the present invention performing the first embodiment of the method according to the first aspect of the present invention, FIGS. 3A and 3B show, respectively, in perspective view and end view, a mixing element used in the batch mixer according to the second aspect of the present invention, and FIGS. 4A and 4B show, in perspective view, the first embodiment of the batch mixer according to the second aspect of the present invention.

In the below description, one or more ' signs added to a reference number indicate that the element referred to has the same or similar function as the element designated the reference number without the ' sign, however, differing in structure.

Additionally, where useful for discussing two or more identical elements, a subscript Arabic numeral is used to designate such further identical elements.

When further embodiments of the invention are shown in the figures, the elements which are new, in relation to earlier shown embodiments, have new reference numbers, while elements previously shown are referenced as stated above. Elements which are identical in the different embodiments have been given the same reference numerals and no further explanations of these elements will be given.

FIG. 1 shows, in perspective view, a first embodiment of a batch mixer 10 according to the second aspect of the present invention. The batch mixer 10 comprises a chassis 12 for supporting the batch mixer 10. On one end of the chassis 12 is attached a first frame part 14. The chassis 12 further supports a cylindrical mixing chamber 16 which is provided between the frames 14. Above the mixing chamber 16 is provided an inlet housing 18. The inlet housing 18 extends between the first and second frame parts 14 and 20. Inside the inlet housing 18 is provided an upper inlet 50, shown in FIGS. 2 and 4, for establishing fluid communication between the exterior of the batch mixer 10 and the interior of the mixing chamber 16 for allowing a batch of materials to be mixed to be introduced into the mixing chamber 16.

Attached to the first frame part 14 is a motor assembly comprising an electric motor 22 and a gear box 24. Mixing chamber 16 further comprises a first end 26 and a second opposite end 28.

Turning to FIGS. 2A and 2B it can be seen that the bottom of the mixing chamber 16 comprises an outlet gate 30 which can be pivoted open to empty the mixing chamber 16 of its contents, i.e. the mixed material, once mixing has been completed.

Turning briefly to FIGS. 4A and 4B it can be seen that batch mixer 10 further comprises a swivable housing part 32 forming part of the second frame part 20 opposite the electric motor 22 and the gear box 24. The swivable housing part 32 comprises a first, outer side 34 and an opposite second, inner, side 36. On the second side are provided steps, one of which is designated the reference numeral 38. The swivable housing part 32 is hinged to be swivable around a horizontal pivot axis 40 for exposing the second side 36 and the steps 38. Using the steps 38 an operator 2 of the batch mixer 10 may easily climb up the steps 38 and inspect the interior of the mixing chamber 16 through an inspection and cleaning opening 42 provided in the second end 28 of the batch mixer 10. When the batch mixer 10 is running, a cover 48 is used to close the inspection and cleaning opening 42. This cover may be integral with the second side 36 of the swivable housing part 32 or may be a separate piece, or is as here shown attached to the batch mixer 10 in the manner of a hatch or door.

FIG. 4B further shows a bearing 44 attached to the second end 28 of the mixing chamber. Turning briefly to FIG. 1 a control device 46 is connected to the electric motor 22 for driving the motor each of the two directions A and B.

Returning now to FIGS. 2A and 2B it can be seen that an injection nozzle 52, for injecting liquid additives to the materials to be mixed, is provided in the upper inlet 50. The positioning of the injection nozzles 52 in the upper inlet 50 has the advantage that any material to be mixed, or mixed material, deposited on the injection nozzles 52 from mixing a batch in the batch mixer 10 is scrubbed off the injection nozzles 52 as the materials to be mixed of the next batch is allowed to fall through the upper inlet 50 into the mixing chamber 16.

The batch mixer 10 further comprises a mixing element, in its entirety designated the reference numeral 60, disposed within the mixing chamber 16. The mixing element 60, shown in FIGS. 2A to 3B, comprises a mixer shaft 62 having a first end 62 attached to the gear box 24 and a second, opposite, end 66 journaled in the bearing 44. The mixing shaft 62 carries six paddle assemblies, one of which in its entirety is designated the reference numeral 70 and which represents a mixing paddle. The paddle assembly 70 comprises an elongated paddle shaft 72 attached to the mixing shaft 62 via a fastening mechanism. The paddle shaft 72 extends radially out from the fastening mechanism 74 around the mixer shaft 62 to a paddle head 76, 76 also referencing the triangular end face of the paddle assembly 70, being prism-shaped and having first, second and third paddle faces 78, 80 and 82. The paddle head 76 is oriented so that the first paddle face 78 is orthogonal to the mixer shaft 62 and turned towards the second end 66 while the second and third paddle faces 80 and 82 are partly turned towards the first end 64 of the mixer shaft 62 and form angles of 60° to the first face 78. Thus, whichever direction the mixer shaft 62 is turning, A or B, one or the other of the paddle faces 80 and 82 will force the materials to be mixed towards the centre of the mixing chamber 16.

The paddle faces 78, 80, and 82 are formed of flat steel plates.

The six paddle assemblies 70 are arranged in two groups of three paddle assemblies whereby the first group comprising the paddle assembly 70 in the figures and being closest to the second end 66 of the mixer shaft 62, during rotation of the mixer shaft forces the material towards the first end 64 of the mixer shaft 62. The second group of three paddle assemblies is positioned closest to the first end 64 of the mixer shaft and includes the paddle assembly $70_1$ which is identical to the paddle assembly 70 but which is turned 180° in relation to the paddle assembly 70. The paddle assembly $70_1$ therefore has its first paddle face $78_1$ turned towards the first end 64 and its second and third paddle faces $80_1$ and $82_1$ turned towards the second end 64 of the mixer shaft 62 and forms angles of +60° to the first paddle face $78_1$. Thus, whichever direction the mixer shaft 62 is turning, A or B, one or the other of the paddle faces $80_1$ and $82_1$ will force the materials to be mixed towards the centre of the mixing chamber 16.

As there are a symmetrical number of paddle assemblies on the two groups, and as the second and third paddle faces 80, $80_1$ and 82, $82_1$ form identical angles to the first paddle face 78, $78_1$, the mixing effect of the batch mixer 10 is the same regardless of the direction of rotation.

Each three paddles assemblies in each of the two groups are positioned staggered 60° in a spiral around the mixer shaft 62. This allows the full length of the inner side of the wall of the mixing chamber 16 to be swept by the paddle assemblies for eliminating any spots where materials to be mixed or mixed materials could accumulate.

Turning to FIGS. 2A and 2B the method according to the first aspect of the present invention is demonstrated for the case where the number of first and second batches are 1, i.e. when a first batch is mixed in a first direction and a second batch is mixed in the opposite second direction.

1. Firstly, shown in FIG. 2A, the electric motor 22 is energized for rotating the mixing element 60 in the A direction.

2. A first batch of materials to be mixed is admitted into the mixing chamber 16 through the upper inlet 50. Any liquid additives needed are then admitted into the mixing chamber 16 through the injection nozzle 52.

3. The first batch of materials to be mixed is mixed as the mixing element 60 rotates in the A direction to produce the first mixture.

4. The first mixture is removed from the mixing chamber 16 through the gate outlet 30 which is opened allowing the mixed materials of the first batch to be discharged from the mixing chamber 16.

At this point there may have formed deposits of materials to be mixed or mixed materials from the first batch. These deposits may for example form on the second paddle face 80 of the paddle assembly 70 and the third paddle face $82_1$ of the paddle assembly $70_1$ as these faces have not engaged the materials to be mixed. Deposits may further have formed on the injection nozzle 52 or in the upper inlet 50.

5. Now, as shown in FIG. 2B, the electric motor 22 is once more energized, this time however for rotating the mixing element 60 in the opposite direction B.

6. A second batch of materials to be mixed is admitted into the mixing chamber 16 through the upper inlet 50. As this second batch of materials to be mixed is allowed to fall into the mixing chamber 16 through the upper inlet 50, the materials to be mixed hit any deposits in the upper inlet 50 or on the injection nozzle 52 and by the force of the impact entrain these deposits and thus clear the injection nozzle 52 and the upper inlet 50 of the deposits.

Any liquid additives needed are then admitted into the mixing chamber 16 through the injection nozzle 52.

7. The second batch of materials to be mixed is then mixed as the mixing element 60 rotates in the B direction to produce the second mixture.

As the mixing element 60 now turns in the B direction, the second paddle face 80 of the paddle assembly 70 and the third paddle face $82_1$ of the paddle assembly $70_1$ will now engage the material to be mixed of the second batch whereby the friction between the materials to be mixed and the second paddle face 80 and the third paddle face $82_1$ now causes any deposits formed during the mixing of the first batch to be removed or scrubbed off the paddle faces 80 and $82_1$.

8. Finally the gate outlet 30 is once more opened to allow the mixed material of the second batch to fall through the outlet gate.

To ensure that the mixing of each batch is identical the duration and intensity of rotation should be the same in each of the directions A and B.

If first and second numbers of batches are to be mixed, steps 2-4 and 6-8 are repeated for each of the number of first and second batches.

As is evident from the above, the batch mixer 10 is at least partially self-cleaning in operation because any deposits formed during mixing of a first number of batches are removed during the mixing of a second number of batches or during the loading of each of the first number of batches or vice versa.

Furthermore, as the mixing effect of the batch mixer 10 is the same regardless of the direction of rotation, each batch is mixed identically providing reproducible mixing. The batch mixer 10 may be operated for a long time and a large plurality of batches without needing cleaning, thus increasing productivity of the batch mixer 10.

LIST OF PARTS WITH REFERENCE TO THE FIGURES

| | |
|---|---|
| A. | Arrows indicating rotation in a first direction |
| B. | Arrows indicating rotation in a second direction |
| 2. | Operator |
| 10. | Batch mixer |
| 12. | Chassis |
| 14. | First frame part |
| 16. | Mixing chamber |
| 18. | Inlet cover |
| 20. | Second frame part |
| 22. | Electric motor |
| 24. | Gear box |
| 26. | First end of mixing chamber |
| 28. | Second end of mixing chamber |
| 30. | Outlet gate |
| 32. | Swivable housing part |
| 34. | First side of swivable housing part |
| 36. | Second side of swivable housing part |
| 38. | Steps |
| 40. | Pivot axis |
| 42. | Inspection and cleaning opening |
| 44. | Bearing |
| 46. | Control device |
| 48. | Inspection and cleaning opening cover |
| 50. | Upper inlet |
| 52. | Injection nozzle |
| 60. | Mixing element |
| 62. | Mixer shaft |
| 64. | First end of mixer shaft |
| 66. | Second end of mixer shaft |
| 70. | Paddle assembly |
| 72. | Paddle shaft |
| 74. | Fastening mechanism |
| 76. | Paddle head |
| 78. | First paddle face |
| 80. | Second paddle face |
| 82. | Third paddle face |

The invention claimed is:

1. A method of operating a batch mixer for producing first and second numbers of mixtures from first and second numbers of batches of materials to be mixed in said batch mixer, said batch mixer comprising:

a mixing chamber, a mixing element disposed within said mixing chamber, said mixing element and said mixing chamber being configured for providing an identical flow of said materials to be mixed within said mixing chamber and around said mixing element regardless of in which of the first and second opposite directions said mixing element is rotated, said mixing element comprising at least two mixing paddles for mixing said materials to be mixed, said mixing paddles being arranged in said mixing element such that rotation of said mixing element, in either of said first direction or said second direction, causes said materials to be mixed to flow, at the same rate regardless of the direction of rotation, towards the centre of said mixing chamber or alternatively towards the opposite ends of said mixing chamber, each of said mixing paddles comprising a closed elongated prism having a first face orthogonal to the axis of rotation of said mixing element and second and third faces forming first and second identical angles to said first face, and a motor assembly coupled to said mixing element for rotating said mixing element for mixing said first and second numbers of batches of materials to be mixed for producing said first and second numbers of mixtures, the method comprising the steps of:
energizing said motor assembly for rotating said mixing element in said first direction,
for each one of said first number of batches of said materials to be mixed:
loading said one of said first number of batches of materials to be mixed into said mixing chamber,
mixing said one of said first number of batches of materials for producing one of said first number of mixtures, and
removing said one of said first number of mixtures from said mixing chamber,
energizing said motor assembly for rotating said mixing element in said second direction, and
for each one of said second number of batches of said materials to be mixed:
loading said one of said second number of batches of materials to be mixed into said mixing chamber,
mixing said one of said second number of batches of materials for producing one of said second number of mixtures, and
removing said one of said second number of mixtures from said mixing chamber.

2. The method according to claim 1, wherein the steps of the method are performed for a plurality of said first number of batches of materials to be mixed and for a plurality of said number of second batches of materials to be mixed.

3. The method according to claim 1, wherein said first and second numbers of batches comprise the same composition and amounts of materials to be mixed.

4. The method according to claim 1 wherein said materials to be mixed comprise ingredients for producing animal feed.

5. The method according to claim 1, wherein said batch mixer comprises an upper inlet fluidly connected to said mixing chamber for admitting said first and second numbers of batches of material to be mixed into said mixing chamber, said batch mixer further comprising at least one injection nozzle for injecting at least one additive into said mixing chamber, said injection nozzle being provided in or on the wall of said upper inlet,
said method further comprising the steps of:
injecting said additive into said mixing chamber from said injection nozzle for mixing said additive with at least one of said first number of batches, and
injecting said additive into said mixing chamber from said injection nozzle for mixing said additive with at least one of said second number of batches,
and wherein the steps of loading said one of said first and second numbers of batches of materials to be mixed into said mixing chamber comprise loading each of said first and second numbers of batches of materials into said mixing chamber through said upper inlet such that said materials to be mixed flow around and past said injection nozzle for at least partially removing any deposit of said materials to be mixed or said first or second number of mixtures from said injection nozzle.

6. The method according to claim 1, wherein the duration, rotational speed and/or intensity of rotation of said mixing element in said first direction is the same as the duration, rotational speed and/or intensity of rotation of said mixing element in said second direction.

7. A batch mixer for producing first and second numbers of mixtures from first and second numbers of batches of materials to be mixed in said batch mixer, said batch mixer comprising
a mixing chamber,
a mixing element disposed within said mixing chamber, said mixing element and said mixing chamber being configured for providing an identical flow of said materials to be mixed within said mixing chamber and around said mixing element regardless of in which of the first and second opposite directions said mixing element is rotated,
said mixing element comprising at least two mixing paddles for mixing said materials to be mixed, said mixing paddles being arranged in said mixing element such that rotation of said mixing element, in either of said first direction or said second direction, causes said materials to be mixed to flow, at the same rate regardless of the direction of rotation, towards the centre of said mixing chamber or alternatively towards the opposite ends of said mixing chamber,
each of said mixing paddles comprising a closed elongated prism having a first face orthogonal to the axis of rotation of said mixing element and second and third faces forming first and second identical angles to said first face, and
a motor assembly coupled to said mixing element for rotating said mixing element for mixing said first and second numbers of batches of materials to be mixed for producing said first and second numbers of mixtures,
said batch mixer further comprising:
a control device for energizing said motor assembly for rotating said mixing element in said first direction for producing said first number of mixtures, and for energizing said motor assembly for rotating said mixing element in said second direction for producing said second number of mixtures,
said control device further being configured for causing said motor assembly to rotate said mixing element with equal duration, rotational speed and/or intensity of rotation in both of said first and second directions of rotation, wherein
said mixing element comprises a mixer shaft and a paddle assembly including an elongated paddle shaft attached to the mixer shaft.

8. The batch mixer according to claim 7, said first and second identical angles being 30° to 80°.

9. The batch mixer according to claim 8, wherein the mixer shaft has first and second opposite ends, and the mixing element comprises at least 4 mixing paddles arranged in first and second groups of two each, the mixing paddles of said first group being positioned closest to said second end of said mixer shaft and oriented for causing said materials to be mixed to flow towards said first end, and the mixing paddles of said second group being positioned closest to said first end of said mixer shaft and oriented for causing said materials to be mixed to flow towards said second end.

10. The batch mixer according to claim 7, said batch mixer comprising an upper inlet fluidly connected to said mixing chamber for admitting said first and second numbers of batches of material to be mixed into said mixing chamber, said batch mixer further comprising at least one injection nozzle for injecting at least one additive into said mixing chamber, said injection nozzle being provided in or on the wall of said upper inlet such that said materials to be mixed flow around and past said injection nozzle when being loaded into said mixing chamber for at least partially removing any deposit of said materials to be mixed or said first or second number of mixtures from said injection nozzle.

11. The batch mixer according to claim 7, said batch mixer comprising an inspection and cleaning opening, said injection and cleaning opening being provided on one end of said mixing chamber.

12. The batch mixer according to claim 11, said batch mixer comprising a swivable housing part on said one end of said mixing chamber, said swivable housing part being swivable around a pivot axis from a closed position, in which the majority of said swivable housing part is provided above said pivot axis exposing a first side of said swivable housing part, to an open position in which said majority of said swivable housing part is provided below said pivot axis for revealing a second side of said swivable housing part, said second side being opposite to said first side and comprising steps for allowing an operator of said batch mixer to ascend said steps for accessing said inspection and cleaning opening or for accessing said upper inlet.

13. The method according to claim 2, wherein said first and second numbers of batches comprise the same composition and amounts of materials to be mixed.

14. The method according to claim 2, wherein said materials to be mixed comprise ingredients for producing animal feed.

15. The method according to claim 3, wherein said materials to be mixed comprise ingredients for producing animal feed.

16. The method according to claim 2, wherein said batch mixer comprises an upper inlet fluidly connected to said mixing chamber for admitting said first and second numbers of batches of material to be mixed into said mixing chamber, said batch mixer further comprising at least one injection nozzle for injecting at least one additive into said mixing chamber, said injection nozzle being provided in or on the wall of said upper inlet, said method further comprising the steps of:
  injecting said additive into said mixing chamber from said injection nozzle for mixing said additive with at least one of said first number of batches, and
  injecting said additive into said mixing chamber from said injection nozzle for mixing said additive with at least one of said second number of batches,
and wherein the steps of loading said one of said first and second numbers of batches of materials to be mixed into said mixing chamber comprise loading each of said first and second numbers of batches of materials into said mixing chamber through said upper inlet such that said materials to be mixed flow around and past said injection nozzle for at least partially removing any deposit of said materials to be mixed or said first or second number of mixtures from said injection nozzle.

17. The method according to claim 3, wherein said batch mixer comprises an upper inlet fluidly connected to said mixing chamber for admitting said first and second numbers of batches of material to be mixed into said mixing chamber, said batch mixer further comprising at least one injection nozzle for injecting at least one additive into said mixing chamber, said injection nozzle being provided in or on the wall of said upper inlet,
  said method further comprising the steps of:
    injecting said additive into said mixing chamber from said injection nozzle for mixing said additive with at least one of said first number of batches, and
    injecting said additive into said mixing chamber from said injection nozzle for mixing said additive with at least one of said second number of batches,
  and wherein the steps of loading said one of said first and second numbers of batches of materials to be mixed into said mixing chamber comprise loading each of said first and second numbers of batches of materials into said mixing chamber through said upper inlet such that said materials to be mixed flow around and past said injection nozzle for at least partially removing any deposit of said materials to be mixed or said first or second number of mixtures from said injection nozzle.

18. The method according to claim 4, wherein said batch mixer comprises an upper inlet fluidly connected to said mixing chamber for admitting said first and second numbers of batches of material to be mixed into said mixing chamber, said batch mixer further comprising at least one injection nozzle for injecting at least one additive into said mixing chamber, said injection nozzle being provided in or on the wall of said upper inlet,
  said method further comprising the steps of:
    injecting said additive into said mixing chamber from said injection nozzle for mixing said additive with at least one of said first number of batches, and
    injecting said additive into said mixing chamber from said injection nozzle for mixing said additive with at least one of said second number of batches,
  and wherein the steps of loading said one of said first and second numbers of batches of materials to be mixed into said mixing chamber comprise loading each of said first and second numbers of batches of materials into said mixing chamber through said upper inlet such that said materials to be mixed flow around and past said injection nozzle for at least partially removing any deposit of said materials to be mixed or said first or second number of mixtures from said injection nozzle.

19. The method according to claim 2, wherein the duration, rotational speed and/or intensity of rotation of said mixing element in said first direction is the same as the duration, rotational speed and/or intensity of rotation of said mixing element in said second direction.

20. The method according to claim 3, wherein the duration, rotational speed and/or intensity of rotation of said mixing element in said first direction is the same as the duration, rotational speed and/or intensity of rotation of said mixing element in said second direction.

* * * * *